(12) United States Patent  
Lee

(10) Patent No.: US 8,432,113 B2
(45) Date of Patent: Apr. 30, 2013

(54) BRUSHLESS FAN MOTOR CONTROL CIRCUIT ASSEMBLY

(76) Inventor: Hsien-Meng Lee, Taichung (TW)

( * ) Notice: Subject to any disclaimer, the term of this patent is extended or adjusted under 35 U.S.C. 154(b) by 225 days.

(21) Appl. No.: 13/070,659

(22) Filed: Mar. 24, 2011

(65) Prior Publication Data

US 2012/0242258 A1 Sep. 27, 2012

(51) Int. Cl.
*H02H 7/09* (2006.01)

(52) U.S. Cl.
USPC ............ 318/400.22; 318/400.34; 318/400.01; 318/400.3; 318/16; 318/431; 363/21.1; 363/125; 361/93.9; 361/59; 361/93.6; 361/93.7; 323/284; 323/223; 323/225; 323/283; 323/285

(58) Field of Classification Search ............ 318/400.34, 318/400.22, 400.3, 400.04, 400.35, 400.01, 318/434, 431; 323/284, 223, 225, 283, 285; 363/21.1, 125; 361/93.9, 59, 93.6, 93.7
See application file for complete search history.

(56) References Cited

U.S. PATENT DOCUMENTS

| 4,384,243 | A  | * | 5/1983 | Muskovac | ..................... 318/729 |
| 6,204,627 | B1 | * | 3/2001 | Watanabe et al. | ............. 318/729 |
| 7,659,678 | B2 | * | 2/2010 | Maiocchi | ................. 318/400.22 |

* cited by examiner

*Primary Examiner* — Walter Benson
*Assistant Examiner* — Jorge Carrasquillo
(74) *Attorney, Agent, or Firm* — Rosenberg, Klein & Lee

(57) ABSTRACT

A brushless fan motor control circuit assembly consists of a high-frequency filter circuit, a rectifier circuit, a power factor enhancing circuit, a current-limit and voltage regulation circuit and a brushless fan motor driving circuit. By means of the high-frequency filter circuit to suppress high frequency noises, the power factor enhancing circuit to enhance the power factor and to save power consumption, the current-limit and voltage regulation circuit to limit the current and to achieve overload protection, the brushless fan motor control circuit assembly controls the operation of a motor of an electric accurately and safely, avoiding fan vibration.

2 Claims, 1 Drawing Sheet

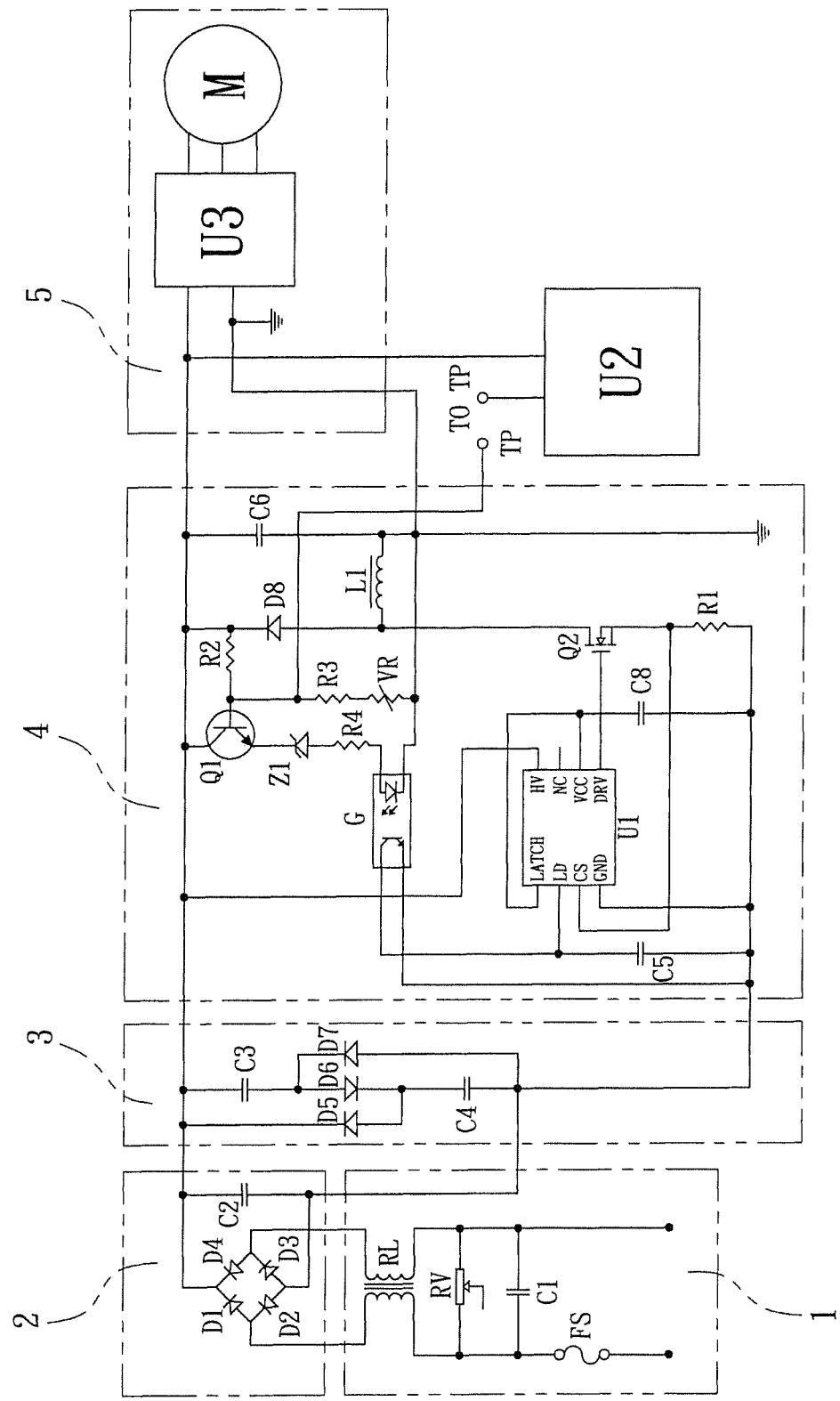

BRUSHLESS FAN MOTOR CONTROL CIRCUIT ASSEMBLY

BACKGROUND OF THE INVENTION

1. Field of the Invention

The present invention relates to electric fans and more particularly to a brushless fan motor control circuit assembly, which controls the operation of the motor of the electric fan accurately and safely, avoiding fan vibration.

2. Description of the Related Art

A conventional brushless motor for electric fan is a low voltage motor that must be used with a power control switch and has drawbacks of big size and high manufacturing cost. Further, a conventional brushless motor has no means to limit the current, to suppress high frequency noises or to enhance the power factor, i.e., low power factor results in waste of power. When a high voltage motor is used with the controller thereof directly connected to city power supply, the field effect transistor (MOS tube) may burn out upon a short circuit or phase lack. Further, the speed control of a brushless motor is done by means of pulse wave modulation (PWM), i.e. by means of pulse duty ratio to regulate the speed. When at a low speed, giving a high voltage repulsing pulse, the rotor is pushed to a next magnetic pole, and then attracted by this next magnetic pole. For controlling the speed, it occupies (stops) a time space so that the controller can change the phase (change the magnetic field), however, repulsion pushes to a next magnetic pole causes magnetic field exchange speed to be high at one time and low at another, and at this time, the fan will vibrate and cause noises.

SUMMARY OF THE INVENTION

The present invention has been accomplished under the circumstances in view. It is one object of the present invention to provide a brushless fan motor control circuit assembly, which controls the operation of the motor of the electric fan accurately and safely, avoiding fan vibration.

To achieve this and other objects of the present invention, a brushless fan motor control circuit assembly consists of a high-frequency filter circuit, a rectifier circuit, a power factor enhancing circuit, a current-limit and voltage regulation circuit and a brushless fan motor driving circuit.

Further, the power factor enhancing circuit consists of a plurality of diodes and two capacitors for enhancing power factor subject to alternative charging and discharging operations of the two capacitors to make a compensation. Therefore, the invention saves power consumption.

Further, the current-limit and voltage regulation circuit consists of a transistor, a Zener diode, a photo coupling crystal, a variable resistor, a high frequency coil, a constant current driver IC (FT807A chip), a field effect transistor (MOS tube) and a current sensing resistor, and adapted for limiting the current and protecting against overload. Subject to the operation of the current-limit and voltage regulation circuit, the pulse duty ration is constant, and therefore the load (electric fan) will not vibrate during operation, avoiding noises.

BRIEF DESCRIPTION OF THE DRAWING

The FIGURE is a circuit diagram of a brushless fan motor control circuit assembly in accordance with the present invention.

DETAILED DESCRIPTION OF THE PREFERRED EMBODIMENT

Referring to the FIGURE, a brushless fan motor control circuit assembly in accordance with the present invention is shown comprising a high-frequency filter circuit 1, a rectifier circuit 2, a power factor enhancing circuit 3, a current-limit and voltage regulation circuit 4 and a brushless fan motor driving circuit 5.

The high-frequency filter circuit 1 consists of a resistor-inductor filter RL, an RV surge protector RV and a filter capacitor C1 for removing high frequency noises.

The rectifier circuit 2 consists of a plurality of diodes D1;D2;D3;D4 for rectifying AC power supply into DC power supply.

The power factor enhancing circuit 3 consists of a plurality of diodes D5;D6;D7 and two capacitors C3;C4 for enhancing power factor subject to alternative charging and discharging operations of the two capacitors C3;C4 to make a compensation.

The current-limit and voltage regulation circuit 4 consists of a transistor Q1, a Zener diode Z1, a photo coupling crystal G, a variable resistor VR, a high frequency coil L1, a constant current driver IC U1 (FT807A chip), a field effect transistor Q2 (MOS tube) and a current sensing resistor R1.

The brushless fan motor driving circuit 5 comprises a motor driver IC U3 electrically coupled with a brushless motor M.

The invention uses the constant current driver IC U1 (FT807A chip) to limit the electric current passing to the brushless fan motor driving circuit 5 and to regular the voltage to a constant level. The constant current driver IC U1 (FT807A chip) comprises a current control pin CS for sensing the end current of the current sensing resistor R1. If the sensed electric current surpasses a predetermined value, the constant current driver IC U1 (FT807A chip) turns off the field effect transistor Q2 (MOS tube) to cut off the electric current (brushless motor top speed current). If the sensed electric current is within the predetermined value, the constant current driver IC U1 (FT807A chip) turns on the field effect transistor Q2 (MOS tube) for letting the electric current to pass. The constant current driver IC U1 (FT807A chip) further comprises a voltage control pin LD. When the shunt voltage of the resistor R2, resistor R3 and the variable resistor VR, after having been amplified by the transistor Q1, surpasses the voltage of the Zener diode Z1, the Zener diode Z1 is turned on, the resistor R4 limits the current, the photo coupling crystal G is turned on, the voltage of the voltage control pin LD of the constant current driver IC U1 (FT807A chip) become low, and therefore the constant current driver IC U1 (FT807A chip) cuts off power supply from the field effect transistor Q2 (MOS tube). If the shunt voltage of the resistor R2, resistor R3 and the variable resistor VR, after having been amplified by the transistor Q1, does not surpass the voltage of the Zener diode Z1, the Zener diode Z1 is turned off, the photo coupling crystal G is turned off, the voltage of the voltage control pin LD of the constant current driver IC U1 (FT807A chip) become high, and therefore the constant current driver IC U1 (FT807A chip) turns on the field effect transistor Q2 (MOS tube), enabling the variable resistor VR to regulate the voltage and to provide a constant voltage to the brushless fan motor driving circuit 5 to drive the brushless motor M.

The brushless fan motor control circuit assembly further comprises a programmable chip U2 electrically connected to the current-limit and voltage regulation circuit 4 for receiving a touch signal or wireless or infrared remote control signal for controlling the speed of the brushless motor M, stopping or starting the brushless motor M, and storing predetermined control procedures.

Although a particular embodiment of the invention has been described in detail for purposes of illustration, various modifications and enhancements may be made without What the invention claimed is:

1. A brushless fan motor control circuit assembly, comprising:
   a high-frequency filter circuit comprising a resistor-inductor filter, an RV surge protector and a filter capacitor for removing high frequency noises;
   a rectifier circuit comprising a plurality of diodes for rectifying AC power supply into DC power supply;
   a power factor enhancing circuit comprising a plurality of diodes and two capacitors for enhancing power factor subject to alternative charging and discharging operations of said two capacitors to make a compensation;
   a current-limit and voltage regulation circuit comprising a transistor, a Zener diode, a photo coupling crystal, a variable resistor, a high frequency coil, a constant current driver IC, a field effect transistor and a current sensing resistor, said constant current driver IC comprising a current control pin and a voltage control pin for controlling on/off of said field effect transistor to limit the electric current passing therethrough to a load and to regulate the voltage to a constant level; and
   a brushless fan motor driving circuit comprising a motor driver IC electrically coupled with a brushless motor for driving said brushless motor.

2. The brushless fan motor control circuit assembly as claimed in claim 1, further comprising a programmable chip electrically connected to said current-limit and voltage regulation circuit for receiving touch signals or wireless or infrared remote control signals for controlling the operation of said brushless motor, stopping.

* * * * *